3,501,564
METHOD FOR BONDING POLYURETHANE TO OTHER MATERIALS
David R. Snoeyenbos, Dayton, Ohio, and Brage Golding, West Lafayette, Ind., assignors to Malleable Research and Development Foundation, Dayton, Ohio, a corporation of Ohio
No Drawing. Continuation of application Ser. No. 125,371, July 20, 1961. This application Dec. 16, 1966, Ser. No. 602,424
Int. Cl. B29h 9/00; B32 7/04; B32b 27/40; H01b 1/02
U.S. Cl. 264—255                                    4 Claims

ABSTRACT OF THE DISCLOSURE

This invention relates to a method of applying to a molding surface a parting agent and forming against the parting agent a layer of uncured resin material other than polyurethane resin. A layer of uncured polyurethane resin is next applied over and on said layer of resin material. The resin materials are integrally cured and bonded together and are removed from the mold surface.

---

This application is a continuation of copending application Ser. No. 125,371, filed July 20, 1961 and now abandoned.

This invention relates to the bonding or adhering of various molded or cast or otherwise formed resin or plastic materials of the polyurethane type to various surfaces and, more particularly, to providing such articles having a surface portion possessing characteristics of good adhesion or bonding to adhesive materials and/or other surfaces to which the article is not otherwise readily or adequately adherent or bondable.

As is now well understood, heat-cured resin elastomers or polymers of the polyurethane type may be molded or formed into a variety of articles having many desirable properties, some of which are not readily obtainable with other resin or plastic materials, including, for example, high abrasion and impact resistance, good mechanical properties, elastomeric properties, high resistance to chemical attack, etc. As is also well understood, however, substantial difficulties may be experienced if it is attempted to bond or adhere already cured polyurethane materials directly to many, if not most, surfaces or substrates to which a firm, permanent, and high strength bonding may be desired in many applications where the particular properties of polyurethane materials may be most useful or desired. For example, difficulty may be experienced in achieving an adhesive bond having a peel strength of as much as 30% or 40% of that desired or achievable with other resin materials to surfaces such as wood, metal, paper, fabric, leather, glass, other plastics, or even polyurethane itself, particularly in applications where it is desired to have the peel strength of the adhesive bond approach approximately the cohesive strength of the polyurethane part itself.

Perhaps one reason for this may be that the high degree of chemical inertness and stability of cured polyurethane-type materials resist chemical bonding with various applied adhesives or that the surface properties of cured polyurethane-type resins may preclude adequate mechanical bonding with adhesive layers or interfaces, or combinations of these factors. Thus, the very advantages or properties of the polyurethane resins which make them attractive for certain applications may actually interfere with or preclude the use thereof in situations where it is desired to have the polyurethane material strongly adhered or bonded to another surface—e.g., linings for vessels or conduits, covering layers for conveyor belts or floors or chutes, solid tires for industrial trucks or conveyor wheels or rollers, wear-resistant pads for foundry patterns, shoe soles and heels, molded automotive and other machine parts, etc.

In any case and for whatever reason, difficulty has been experienced in achieving desirably high adhesive bond strength (of as much as about 120 pounds per inch peel strength, or approximating the cohesive rupture or tear resistance of the polyurethane itself) between the surface of a cured polyurethane article and another surface and using a variety of adhesive materials (even polyurethane adhesives).

As will be understood, it may be possible to achieve some substantial bond strength between a layer or article of polyurethane material and another surface if the uncured polyurethane material is originally prepared or cast and cured against the surface to which an adhesive bond is desired (which may also require a prior application of a primer coating). Since, however, a curing time of several hours at elevated temperature may be required for curing polyurethane materials in the molding or casting thereof, substantial problems of production facility or economics may be encountered if it is attempted to both form and cure the polyurethane article or layer against the particular part or surface with which it is later to be used. Similarly, especially with permanently installed surfaces (e.g., floors or bins or chutes) and/or large surface areas (e.g., tanks or pipes or vessels of substantial size) to which polyurethane layers or linings are desired to be applied, the casting or forming and the curing of the polyurethane materials in situ onto the surface to which adhesive bonding is permanently and ultimately desired may be highly impractical or undesired.

With irregularly or complexly shaped polyurethane-type articles (or even surface layers for irregular or complex surfaces) or replacement parts to be affixed to existing structures or relatively small molded polyurethane-type articles to be adhered to but a small part of a larger structure, etc., attempting to utilize techniques involving the entire formation and casting or molding and curing of the polyurethane material actually on or against the surface to which it is to be adhered may be, as a practical matter, almost completely out of the question commercially. Similarly, if it is attempted to alleviate such problems by providing a mechanical backing layer on one surface of the polyurethane part (e.g., a layer of fabric partially imbedded in one surface of a polyurethane sheet) in order to form a more bondable surface for adhering to another surface, difficulty may still be experienced in achieving a total adhesive strength of the bonded joint as high as desired and/or in applying such a technique advantageously at all to irregularly or complexly molded articles or parts.

According to this invention, however, there is provided for the forming or molding or casting of articles of almost any shape or size from polyurethane and like types of resin materials to be adhered to another surface and with the resin articles being substantially completely formed and cured separately from the surface to which they are ultimately to be adhered; and such results are achieved in accordance herewith by the formation of a bonding layer on all or a part of the resin article surface and comprising a resin material different from the elastomeric polyurethane-type resin of the article and having good adhesive receptivity and bonding characteristics, with the resin article and the bonding layer thereon being formed or molded and cured concurrently or together to provide permanent unification or cross-linking or chemical and mechanical integration thereof as the bonding layer and the article are cured together whereby a readily bondable surface layer or area is produced on the molded resin article having good receptivity and bondability to other surfaces upon the later application of a bonding adhesive to the bonding layer of the completely cured article.

One object of this invention is to provide a completely cured resin article of a synthetic resin polymer material having poor receptivity or bondability with regard to adhesive materials for bonding the article to another surface, which resin article includes on at least a part of the surface thereof an integral layer or area of a different material having good bondability and receptivity for adhesives for bonding or adhering the resin article to another surface.

Another object of this invention is to provide a method of the character described for incorporating into a cured synthetic resin polymer article an integrally produced surface area of another material having enhanced bondability and receptivity for adhesives for use in adhering the article to another surface.

A further object of this invention is to provide a method of the character described for forming and curing molded or cast polyurethane-type resin articles which include in at least a part of a surface thereof an integrally formed layer or area of a different resin material having greater bondability and receptivity to adhesives than the polyurethane-type materials, and for forming both the polyurethane resin articles and the integrally formed surface layer or area substantially concurrently, and curing both said materials together simultaneously with the formation of mechanical and chemical bonding or cross-linking between the polyurethane and the other resin to integrate or unify both permanently into the finished cured article.

Still another object of this invention is to provide a cured polyurethane resin article having in at least a portion of a surface thereof a bonding layer formed from a different synthetic resin material, with the bonding layer permanently mechanically and chemically unified and integrated with the polyurethane, and with the bonding layer having a greater bondability and receptivity for adhesive materials than the cured polyurethane resin.

A still further object of this invention is to provide a method of the character described for forming polyurethane resin articles having an integrally formed resin bonding layer over at least a portion of a surface thereof with greater bondability and receptivity for adhesives than the polyurethane resin, which method includes applying a layer of uncured resin for the bonding layer to a molding surface, forming the polyurethane article on and over the layer of bonding resin prior to the complete curing of either the polyurethane resin or the bonding layer resin, and then curing both resins together effecting diffusion and cross-linking of one into the other to achieve permanent unification and integration thereof into the completely cured article.

Other objects and advantages of this invention will be apparent from the following description and the appended claims.

In the following description of various illustrative materials and methods and products in accordance with and for practising this invention, reference will be made to the so-called polyurethane-type resins as principally illustrative of the type of synthetic materials particularly adapted for use in accordance herewith and/or to which the advantages hereof especially obtain, although the application of this invention and the teachings hereof are not necessarily to be limited to synthetic resin materials coming strictly within the term "polyurethane" as presently understood. As generally representative of materials coming within the class of so-called polyurethane-type resin elastomers may be noted synthetic resinous polymeric materials characterized essentially by the recurring presence of a urethane group (—NH·COO) in the main chain.

As well understood in this art, such polyurethane resins (also sometimes known as "polyisocyanates") are, essentially, condensation products of polyisocyanate materials with compounds bearing a multiplicity of hydroxyl groups or other groups containing a plurality of active hydrogen atoms (such as polyhydric alcohols, polyamines, polycarboxylic acids, polyesters having unreacted hydroxyl groups, etc.), with such interaction or condensation being catalyzed or aided by the addition of a variety of materials containing active hydrogen atoms. Such materials are readily formed into a variety of resin products of varying properties, depending somewhat upon the choice of the particular reactants, and are readily produced in either solid or foam state, depending upon whether a blowing agent is injected into or produced in the reacting materials during the reacting and curing steps thereof, in known manner. Similarly, articles are readily produced from such materials in either solid or foam state and in a wide variety of shapes or configurations by casting or molding or otherwise forming the reacting materials in the shape or configuration desired during or before completion of the reaction and curing of the resin materials.

As noted above, although the various polyurethane-type resin materials exhibit, in cured and completed form, a wide variety of highly useful and advantageous properties of both a mechanical and chemical nature, full advantage of many of these properties is to be realized in many possible applications only if the polyurethane article can be readily and strongly or permanently adhered or otherwise affixed to a metal or wood or other surface, and, in many such possible useful applications, adhering the polyurethane part or articles to another surface may be desired or preferred over any type of mechanical affixing means.

Nevertheless, it has been found that the properties of cured polyurethane articles (perhaps the very properties which provide the desirable characteristics of these materials) resist or are inimical to formation of desirably strong or firm adhesive bonding of cured polyurethane materials to other surfaces (even to another cured polyurethane surface). That is, it has been found difficult to achieve an adhesive bond strength much above 50% of that which might be desired in attempting to adhere cured polyurethane articles to another surface utilizing known types of materials, and bond strengths not exceeding 10% or 20% of the maximum desired are more commonly obtained. Thus, it may be desired to adhere a polyurethane article to another surface with sufficient bond strength so that the adhesive bond will not fail or tear when subjected to a disruptive force not sufficient to tear the polyurethane part itself, and/or to achieve an adhesive bond having a peel strength of up to about 120 pounds per inch, as a peel strength which approximates the tear resistance of solid polyurethane materials, rather than merely a small fraction of such bond strength or peel strength.

It may be possible to achieve a substantial bonding of polyurethane materials to another surface if the polyurethane resin is actually cast against or formed and cured against the other surface, but such techniques, obviously, may not be desired (in view of the curing time required and/or the complexity of the parts involved), and may, indeed, be virtually impossible to achieve for some industrial or commercial applications (such as, for example, polyurethane flooring tile, linings for large tanks, the manufacture of polyurethane replacement parts, etc.).

According to this invention, however, satisfactory results have been achieved in providing polyurethane-type resin articles to be readily and strongly adhered to another surface by incorporating into the surface of the resin article during the forming and curing thereof a bonding layer or area of a different and readily bondable material such as, for example, an epoxy-type resin. Articles in accordance herewith are provided in virtually any shape, and, specifically, in the form of flat sheets of varying thicknesses or rods or chunks of more or less regular form, as well as in highly complex or irregular molded shapes, and in the form of either solid (i.e., noncellular) polyurethane materials or foamed structures. By providing a bonding material such as an epoxy-type resin, on or in a portion of the surface of the polyurethane article during the formation and curing thereof—so that the polyurethane article and the bonding layer are, at least partially, cured together—and by selecting a particular material for the bonding layer possessing the desired characteristics of bondability or adhesive receptivity, a finished and cured integrated article is provided which can be readily adhered or bonded to another surface with an ease of application and achieving bonding strengths much greater than are to be obtained with cured polyurethane alone and/or with polyurethane materials having some sort of fabric or other backing layer thereon to aid in bonding, etc.

Although a variety of other resinous materials are available for forming the integral bonding layer or area in a folded or formed or cast article of cured polyurethane resin, particularly satisfactory results have been achieved in accordance herewith utilizing for such bonding layer resins generally of the epoxy type, and reference to such resins will be made herein as illustrative of a satisfactory mode of carrying out this invention for the formation of articles embodying and in accordance with this invention.

As broadly or generally illustrative of a process or a system for the production of resin articles in accordance herewith, one may note an arrangement or method in which a resin article is to be formed in a mold of a particular shape, generally in accordance with conventional techniques for molding polyurethane resins. In such a situation the wall of the mold cavity (or a portion thereof) which defines the surface of the finished article to which it is desired to impart enhanced bondability and receptivity to adhesives is treated with a suitable parting agent, such as polyvinyl alcohol or a wax material in known manner, and then an epoxy resin material (selected to have the desired surface or bonding characteristics when cured) is applied in liquid or fluent form (and admixed with a suitable hardening agent or curing catalyst therefor in known manner) as a relatively thin layer over the designated or desired portion of the mold cavity, as by brushing or spraying or otherwise applying the liquid resin.

If necessary (depending upon the viscosity of the epoxy resin as applied and/or whether applied in molten or solution form), the epoxy layer may be allowed to cool or stiffen or even slightly cure, but only to a point of self-sustaining viscosity and tackiness, not to a completely cured state. Then, a fluent and uncured polyurethane resin material (or a mixture of reactants for forming such resin material) is poured into the mold over and around the preformed epoxy layer, and the polyurethane-producing reaction is completed in the usual manner, with the final heat curing of both polyurethane resin and epoxy resin occurring together and with the polyurethane resin on or around the epoxy resin layer in the mold prior to the complete curing of either resin material.

Thereafter, the completely cured article is removed from the mold and possesses, predominantly, the various characteristics of the polyurethane material, while having a surface layer or area on at least a portion of a surface thereof composed substantially entirely of epoxy material having the desired characteristics of bondability and adhesive receptiveness, yet integrally united with and into the polyurethane article, thereby providing a surface area which can be firmly bonded to a variety of other surfaces or substrates, in known manner, by a wide variety of satisfactory adhesives utilized for adhering epoxy materials to other surfaces.

As will be readily understood from the foregoing, satisfactory results are also obtained in the production of flat sheets of polyurethane resins of a variety of thicknesses by casting, in known manner, the polyurethane material onto a flat casting surface to which has previously been applied a thin layer of uncured epoxy resin material, and curing the polyurethane and epoxy materials together to form a sheet, one surface of which is predominantly made up of bondable epoxy resin integrally united with the polyurethane material.

Although the exact mechanism whereby the enhanced advantages and results of this invention are obtained may not now be completely known with certainty, useful hypothesis may be made. For example, since the mixture of polyurethane materials is applied, in substantially liquid or at least fluent form, over the preformed layer of epoxy materials before the complete hardening or curing of either resin, some diffusion of the two resin materials into each other probably occurs prior to curing and thus to form, even without additional interaction, a much stronger bond at the interface of the two materials than would obtain between two materials or two surfaces in the absence of mutual diffusion at the interface. Additionally, one may hypothesize the occurrence of an actual chemical bond or cross-linking reaction at the interface between the polyurethane and epoxy materials, as both materials are cured together into their final form, and particularly where the hardener or curing agent incorporated into the epoxy material is a substance (e.g., a polyamide as conventionally used for hardening epoxy resins) which also has the property of acting as a hardener or curing agent reactant with polyurethane materials (whether or not the same hardener be included in the particular polyurethane mixture applied).

Any such actual chemical bond between the two layers acts in addition to whatever physical or mechanical bonding may be formed therebetween as resulting from diffusion at the interface or otherwise from maintaining the two materials together and in contact with each other during transition from a liquid or fluent state to the finally cured form thereof. As will be understood, the foregoing applies generally both to the situations where the polyurethane material is finally formed as a solid or a noncellular body or layer and also where the polyurethane is caused to foam, in known manner, during the polyurethane reaction and prior to the curing thereof against epoxy or other preformed bonding layer material.

The particular extent of the area of the bonding layer or layers in accordance herewith, as well as the thickness and other characteristics thereof, will depend to a substantial extent on the particular configuration of the final molded article and the uses to which it is intended to be put, yet such considerations are merely matters of specific design readily comprehended within the teachings set forth herein and readily obtainable in accordance with this invention by selecting or utilizing any one of a variety of particular materials possessing characteristics adapted to the end result desired, while still forming the composite article in accordance herewith by the concurrent or simultaneous curing together of the bonding layer material with the resin material forming the bulk or body of the article.

As illustrative of some such considerations, however, it may be noted that satisfactory results have been obtained herewith utilizing both flexible and brittle varieties of epoxy materials for the bonding layer of a polyurethane sheet or other molded article. Indeed, even a brittle bonding layer of epoxy material too thick to avoid cracking upon flexing produces satisfactory results when utilized with a relatively flexible polyurethane material and even when bonded to a flexible surface because, perhaps as a result of the intimate and chemical integration or cross-linking between epoxy and polyurethane materials, any possible cracking of a brittle bonding layer in use does not appear to interfere with or to weaken appreciably an adhesive bond between the epoxy bonding layer and another surface, whether rigid or flexible, provided, of course, that the particular bonding adhesive is selected with characteristics of flexibility compatible with the uses to which the final article is to be put.

Similarly, satisfactory results are achieved herewith in situations where the bonding layers or areas are not necessarily completely continuous, provided only that a sufficient proportion of the surface at which an adhesive bond is desired to be composed primarily of the bondable or adhesive receptive epoxy bonding layer material. Thus, some of the liquid polyurethane resin material may diffuse completely through the liquid epoxy material during formation of the article and prior to the curing thereof without undesirably reducing the bondability of the resulting surface, provided only that there is at the bonding surface sufficient of the bondable resin present to provide the desired bond strength with whatever bonding adhesive is used. Similarly, the bonding layer material may be originally applied in a discontinuous pattern or in discrete areas to form an intentionally discontinuous bonding layer, which has, nevertheless, sufficient bonding area to achieve whatever bonding strength may be desired for a particular application. Also it may be desired or advantageous to provide a plurality of bonding layers with the intermediate material adapted to bond the resin body to another bonding layer made of another material selected for a particular characteristic.

In this connection, it may be noted that such considerations as the extent of diffusion of the polyurethane material into or through the epoxy bonding layer during formation of the article (and/or, conversely, possible diffusion or migration of the epoxy layer wholly into the polyurethane body of the article) are factors which are satisfactorily adjusted and controlled in accordance herewith by controlling and adjusting the relative viscosities of the polyurethane and epoxy materials at the time that they are brought into contact with each other during the formation of the article. Thus, the epoxy material may be first applied to the mold or casting surface in the form of a liquid having widely varying viscosities depending upon temperature, solvent content, etc., as may be desired for the particular method of application, etc. As noted, it is preferred that the epoxy layer be allowed to stiffen or slightly cure to some extent prior to the application thereto of the polyurethane material, and it will be understood that, regardless of how low the viscosity of the epoxy material may be at the time of application thereof to the casting surface or mold cavity, the resulting layer may be partially set to a highly viscous or tacky and self-sustaining consistency prior to application of the polyurethane material, provided only that the latter is applied over the epoxy bonding layer prior to the complete curing of either material.

Similarly, the particular viscosity of the polyurethane resin or mixture of materials added to the mold or on a casting surface over the uncured bonding layer may be readily controlled in known manner and within wide limits, and this serves as a further ready manner for controlling the extent of diffusion or migration (or lack thereof) into or through the uncured bonding layer material. Also, the relative thicknesses of the bonding layer and the polyurethane materials, as well as such considerations as the orientation thereof with respect to the mold or casting surface to which applied, as well as the fluidity of the materials, has a readily controllable effect on the extent of diffusion or intermingling thereof. In this connection, it may be noted that the bonding layer produces satisfactory results in accordance herewith even when the thickness thereof is but a small fraction or proportion of the thickness of the polyurethane part of the article. Thus, satisfactory results have been achieved herewith in the manufacture of, for example, shoe soles and the like, with adequately strong adhesive bonding (strong enough to withstand cohesive failure of the polyurethane layer itself) when the multi-layer articles are as much as ½ inch or more in thickness and the bonding layer of epoxy resin was no more than approximately .001 inch thick; while, on the other hand, the desirable strength characteristics and other enhanced properties of the finished polyurethane article have not been found to be diminished when the thickness of the epoxy bonding layer is as much as ½ inch or more.

As noted above, although polyurethane and epoxy materials have been referred to as illustrative of substances for use in accordance herewith, the advantages of this invention are obtainable with a wide variety of individual substances, and this discussion is to be considered as merely illustrative of the invention and as comprehending within the term "polyurethane" the various resin materials or classes of resin materials having a urethane group in the polymer chain—whether of the so-called polyester-urethane type or polyether-urethane type of material, including the so-called "blocked" prepared adducts for producing such synthetic resin polymers, and regardless of the particular chemical reaction by which the final polymeric material is produced and cured. Similarly, the epoxy-type resins discussed above are to be understood as comprehending the wide variety of materials within the recognized class of such resins characterized by generally, the condensation of materials such as epichlorohydrin with phenolic materials such as bis-phenol A, with the resulting materials being catalyzed or hardened or cured by reaction (with or without heating) with or in the presence of suitable curing agents such as polyfunctional amines or acid anhydrides, etc.

It is also to be understood that materials other than those specifically or strictly coming within the recognized class of epoxy resins may also, satisfactorily, be utilized for forming the bonding layer in accordance herewith, provided only that such materials are cured into a finished layer having the desired bonding or adhesive receptivity, and that they are sufficiently compatible with the polyurethane or other resin material used for the major portion of the molded articles so that a mutual or concurrent or simultaneous curing may be effected, with, preferably, also some mutual diffusion of the materials at the uncured interface therebetween and/or, for greater strength, some formation of a cross-linking or other chemical bond, preferably enhanced by a common ability of both materials to react with curing or hardening agents or catalysts present at the interface in connection with the curing of either of the two materials. For example, satisfactory results have been achieved in accordance hereinwith by utilizing for the bonding layer of articles embodying this invention, instead of materials which might be said to be strictly within the group of epoxy resins, such materials as phenolic-polyamide resins, phenolic-epoxy adhesive resin materials, resorcinol-polyamide resin materials, etc., as well as epoxy-type resin precursors which can be polymerized to form the desired bonding layer such as monomeric epoxidized phenolic and styrene compounds, etc., as will be understood from the disclosure and teachings hereof.

Of course, the same properties and enhanced advantages or degree of enhancement of particular bond strength are not, necessarily, inherently present equally or to equal extents in all the variety of materials with which satisfactory results are achieved in accordance herewith nor for all types of applications or uses thereof—especially when a particular polyurethane or another material is selected for the strength or other physical or chemical properties desired, while the particular material for the bonding layer of the finished article is selected for the surface characteristics or bondability or receptivity of adhesives to obtain the bond desired to a specific surface with a desirably high bond strength greater than would be obtainable in the absence of the integral bonding surface layer or area provided on the finished and cured article in accordance herewith.

As further illustrative of the materials and techniques embodying and for practising this invention and with which satisfactory results were achieved may be noted the manufacture of molded strips for bonding to metal surfaces in accordance herewith. Thus, the mold wall against which the bonding layer was formed was wiped with a soft wax and then sprayed with a solution of polyvinyl alcohol dissolved in ethyl alcohol to provide a parting film of a thickness of about .0005". Thereafter an epoxy resin material was brushed on the thus prepared mold wall to form a layer of about .001" to .010" in thickness, and consisted of a mixture of four parts epoxy resin ("Epon" No. 815, sold by Shell Chemical Co.) and one part of polyamide hardener therefor ("Epon T-1," also sold by Shell).

The polyurethane resin used was a material produced by condensation of diisocyanate with a polyalkylene glycol and having a specific gravity (at 75° F.) of about 1.06 and a Brookfield viscosity at 86° F. of about 6000–8000 cps. and an isocyanate content of about 6.2–6.5% ("Adiprene L167" sold by E. I. du Pont de Nemours and Co.). This material was first heated to about 250° F. and degassed under a total pressure of about 5 mm. Hg for about ten minutes. At the same time a quantity of catalyst or hardener material such as 4,4'-methylene-bis-(2 cholroaniline) hardener ("Moca" also sold by Du Pont) was heated to about 220° F. About 20 parts of the hardener were poured into about 100 parts of the urethane resin and mixed for three minutes at a temperature of about 160° F. Immediately the mixture was poured into the mold at room temperature—it being understood, of course, that such steps were carried out so as to fill the mold with urethane materials before the epoxy layer therein had become stiff or hard. The mold was then allowed to rest several hours at room temperature, and then heated in an oven at about 160° F. for two to three hours.

After both resin materials were completely cured together in the mold, the molded part was stripped therefrom and the bonding or epoxy surface was washed free of any remaining polyvinyl alcohol parting film thereon. This molded composite part was then bonded to a piece of metal by polishing the surface of the metal to a bright metallic finish and washing both the metal surface and the epoxy resin bonding surface with an active solvent, such as methyl ethyl ketone. As an adhesive, there was used the same epoxy resin noted above, which was mixed and applied to the metal surface and the molded part brought into close contact therewith in known manner. The adhesive resin was then set by standing 12 hours at room temperature and/or in the shorter time by heating up to about 200° F. or more, and the resulting bond of resin to the metal surface withstood peeling forces up to about 100 pounds per inch and/or generally in the range where failure of the resin-metal band occurred in the resin itself, rather than in the bonded interface.

In this connection, as will be understood, the testing and evaluation of bond strengths for adhering molded resin articles such as here described to various surfaces is appropriately evaluated with regard to the ultimate use to which the final combination is to be put. For example, the bonding stregnths of resins are routinely determined with regard, alternatively, to peel strength (i.e., the force required to pull the bonded resin article away from a rigid surface by bending a portion of the article approximately 90° to the surface) or as shear strength (i.e., the force required to separate a lapped joint loaded in tension along lines parallel to the joint). The bond strengths achieved by various articles and various adhesives, of course, may give very different values for these two methods of testing or evaluation, and, similarly, whether or not a certain joint gives adequate bonding or adhesive strength for a particular application must be related to whether the disruptive forces encountered in use are more likely to be shearing forces or peeling forces.

The bond strengths noted herein are generally expressed in terms of peel strength, and are set forth as more particularly indicative of the actual adhesive strength and more or less independent of the tensile strength of a strip of resin material. Such peel strength results noted herein have been made using a one inch wide strip of resin material about ¼ inch thick and with the polyurethane portion thereof having a Shore A hardness of about 92–96. This test strip is pulled at 90° away from a rigid base, and the strength results are a notation of the force needed to continue a failure in terms of pounds per inch. For comparison purposes, a solid block of polyurethane material 1 inch x 4 inches x 4 inches was prepared with a saw cut near one edge to free a tab ¼ inch thick and 1 inch wide, and the tab was pulled out 90° from the remainder of the block in a manner to simulate the adhesive peel test. In the range of 120–140 pounds per inch of pull, some tearing began, with apparently local or unequal stresses. After this initial tearing, the pull required to continue failure increased to about 160 pounds per inch, which seemed to be the ultimate tear resistance of the material.

Furthermore, in evaluating adhesive strengths or bond strengths achievable in accordance herewith, the surface to which the polyurethane article is adhered plays a significant part in evaluating the utility or acceptability of the resulting product, as does the adhesive used. For example, evaluations have been made adhering or bonding a polyurethane article including an epoxy bonding layer as noted above to prepared surfaces of conventional rubber heels for shoes and/or smooth rubber industrial tires using the epoxy adhesive noted. Whereas such bonded articles achieved a peel strength of only about 50 pounds, as tested above, rather than the 120 pounds achieved in bonding to a metal surface, such peel strengths appear to be virtually the maximum obtainable on such rubber articles because, for example, actual failure of the composite rubber-urethane article occurred within the rubber itself, not in the adhesive bond, and/or with the exposed surface of the failed bond having rubber clinging thereto after failure.

Other examples indicative of the utility and various operative considerations of this invention may also be noted. For example, as particularly suggestive of the desirability of utilizing for the resin of the bonding layer a hardener which is also reactive in the polyurethane reaction, an article was made as above noted and with the same urethane and epoxy materials, but the hardener for the epoxy resin was an n-amino ethyl piperazine hardener. When the finished product was tested as above, peel strengths up to about 70 pounds per inch were obtained (i.e., higher than are normally expected in bonding polyurethane alone and without the epoxy bonding layer, although less than the 120 pounds achieved with the above example) but the ultimate failure was noted to occur at the interface between the polyurethane and the bonding resin, indicating that, although enhanced results were achieved, optimum results may also be affected by the choice of the particular hardener for the epoxy bonding layer.

When resorcinol-formaldehyde resins (e.g., "Pancolite G-1131" sold by Koppers Co.) were used for the bonding layer with polyurethane articles according to the foregoing technique, but preferably with a room temperature cure, peel strengths of the order of 75 pounds per inch were achieved, while similar articles made utilizing phenolic epoxy and phenolic-epoxy-polyamide resin materials for the bonding layer (e.g., "Bondmaster M-344" sold by Rubber and Asbestos Corp. and "T-106 R" sold by Adhesives Products Corp.), peel strengths of the order of 80 pounds per inch and 70 pounds per inch, respectively, were achieved. By contrast, epoxy-polyamide and butylated phenolic resin materials, when used as above for the bonding layer in polyurethane articles, produced substantially lower peel strengths of around 30–55 pounds per inch, thus indicating, also, that the properties of the adhesive for the chemical relation thereof to the resin of the bonding layer are important.

A variety of other polyurethane materials has also been utilized in accordance herewith with satisfactory results in addition to that mentioned above. These include flexible and rubber-like polyurethane mentioned and similar materials having somewhat higher viscosities (e.g., 14,000–19,000 cps. at 86° F.) and lower isocyanate contents (e.g., 4.0–4.3%). Similarly, a harder and more rigid polyurethane material (having a specific gravity of about 1.15 at 75° F., viscosity at 84° F. of 12,000–18,000 cps., and an isocyanate content of about 9.2–9.5%) has also been used satisfactorily, although the pot life of the mixture (including mixing time) may be substantially shorter than with the more flexible materials (e.g., two minutes as compared to 15 minutes), and, accordingly, this consideration itself may interject a complication into the actual handling and molding technique utilized for certain applications. Indeed, this latter harder material (giving a Shore D-75 hardness) is really too stiff for an adequate peel strength measurement as noted above, although shear test indications show good bond strengths obtained and substantially better than the adhesion of the polyurethane material without an integral bonding layer of epoxy resin in accordance herewith.

In addition to the aromatic amine hardener or catalyst for the polyurethane mentioned above, a variety of other reactants were successfully utilized (e.g., mixtures of cumene diamine and m-phenylenediamine, etc.), as will be understood, depending upon the particular type and requirements for the polyurethane material, all as well understood in this art. Similarly, a wide variety of adhesives, as well known for bonding epoxy resin and other resing materials to other surfaces, may be readily utilized in addition to those mentioned above, and such adhesive materials, as will be understood, satisfactorily include various contact or solvent-type adhesives, in addition to the heat-cured varieties, depending upon the particular surface to which the bond is to be made and the ultimate characteristics desired or required at the adhesive interface.

Accordingly, as is apparent from the foregoing, there is provided with this invention suitable means and materials and techniques for producing molded or cast or formed articles of polyurethane-type resin materials in virtually an infinitude of sizes and shapes, all of which are readily adhered to a variety of other surfaces or substrates by known adhesives to form adhesive bonds generally in excess of the strengths obtainable with polyurethane materials alone and certainly adequate for a variety of uses of the bonded articles, and this is accomplished by the formation in the polyurethane article of a special bonding layer or area of bondable resin material integrally metchanically and chemically formed with the main article by virtue of the concurrent curing of the two materials together and/or the molding or casting of the two together prior to the curing of either.

What is claimed is:

1. In a method for producing a molded cured polyurethane plastic article for subsequent bonding by an adhesive to a surface other than a molding surface against which said article was molded and formed, said article as produced including a substantially completely freely exposed and uncovered adhesive-receptive bonding surface layer on the portion thereof which is subsequently to be bonded by an adhesive to said other surface, the steps which comprise applying to at least a portion of a molding surface a parting agent, forming said bonding surface layer against the portion of said molding surface coated with said parting agent for defining the outer configuration thereof from a fluent and uncured resin material other than a polyurethane resin and which is more receptive when cured to bonding adhesives than is cured polyurethane and selected from the group consisting of epoxy resins, phenolic-polyamide resins, phenolic-epoxy adhesive resins, resorcinol-polyamide resins, and mixtures thereof, forming the remainder of said article from said polyurethane resin material in uncured state over and on said bonding surface layer resin and prior to the curing thereof, curing both said resin materials together simultaneously to form said article with said adhesive-receptive bonding surface layer premanently and integrally cured and bonded with said polyurethane resin material, and removing said cured and finished article from said molding surface for subsequent adhesive bonding of said bonding surface layer portion of said article to another surface.

2. A method as recited in claim 1 in which the resin material for forming said bonding surface layer is an epoxy resin.

3. A method as recited in claim 1 in which said curing of said bonding surface layer resin and said polyurethane resin is effected by the addition thereto of at least one curing reactant for said resin materials.

4. A method as recited in claim 3 in which at least one of said added curing reactants is effective for curing reaction with both said bonding surface layer resin and said polyurethene resin materials.

References Cited
UNITED STATES PATENTS

| | | | |
|---|---|---|---|
| 3,042,545 | 7/1962 | Kienle et al. | 117—75 |
| 3,100,756 | 8/1963 | Fry | 260—30.4 |

WILLIAM J. VAN BALEN, Primary Examiner

U.S. Cl. X.R.

161—184, 188, 190; 264—331, 338